United States Patent
Chaslin (12)

(10) Patent No.: US 8,414,812 B2
(45) Date of Patent: Apr. 9, 2013

(54) METHOD AND DEVICE FOR THE HIGH-SPEED PRODUCTION OF PLASTIC MATERIAL BODIES HAVING AN OUTER SURFACE PROVIDED WITH A LABEL

(75) Inventor: Dominique Chaslin, Ratenelle (FR)

(73) Assignee: Albea Services, Gennevilliers (FR)

( * ) Notice: Subject to any disclaimer, the term of this patent is extended or adjusted under 35 U.S.C. 154(b) by 0 days.

(21) Appl. No.: 12/739,805

(22) PCT Filed: Oct. 22, 2008

(86) PCT No.: PCT/FR2008/001477
§ 371 (c)(1),
(2), (4) Date: Oct. 7, 2010

(87) PCT Pub. No.: WO2009/087316
PCT Pub. Date: Jul. 16, 2009

(65) Prior Publication Data
US 2011/0012292 A1 Jan. 20, 2011

(30) Foreign Application Priority Data
Oct. 26, 2007 (FR) ...................................... 07 07537

(51) Int. Cl.
*B29C 45/14* (2006.01)
(52) U.S. Cl.
USPC ......................... 264/259; 264/275; 264/297.3
(58) Field of Classification Search .................. 264/259, 264/275, 297.3
See application file for complete search history.

(56) References Cited

U.S. PATENT DOCUMENTS

| | | | |
|---|---|---|---|
| 3,602,496 A | 8/1971 | Langenohl et al. | |
| 5,104,306 A | * 4/1992 | Gordon et al. | ................ 425/503 |
| 5,885,408 A | * 3/1999 | Kaminski | ..................... 156/567 |
| 6,007,759 A | * 12/1999 | Ten Tije et al. | ............... 264/478 |
| 6,616,441 B1 | 9/2003 | Zakich | |

FOREIGN PATENT DOCUMENTS

| | | |
|---|---|---|
| EP | 1637457 A | 3/2006 |
| EP | 1745911 A | 1/2007 |
| FR | 2009611 A | 2/1970 |
| FR | 2656277 A | 6/1991 |

OTHER PUBLICATIONS

International Search Report, Jul. 2009.

* cited by examiner

*Primary Examiner* — James Sanders
(74) *Attorney, Agent, or Firm* — Banner & Witcoff, Ltd.

(57) ABSTRACT

The invention relates to a method for the injection molding of a body having at least one wall portion covered on the outside by a label, that comprises: a) using a molding assembly (50) including two mobile parts, one of which at least includes a cavity for making said wall portion; b) using a pick-up means (10), a transfer means (20) and a deposition means (29) for the labels; c) actuating said transfer means so that the label is brought to the cavity and depositing said label in said cavity; d) removing said transfer means, and closing the molding assembly in order to proceed with molding; characterized in that it comprises using a machine including: A) a rotary platen (60) for supplying a plurality of work stations, and on which the molding assembly is mounted; B) an injection press provided at a work station, the molding assembly arriving in a closed and locked configuration at the station and being pressed against said injection press in order to fill the chamber; C) said transfer means (20) at an upstream station.

13 Claims, 3 Drawing Sheets

METHOD AND DEVICE FOR THE HIGH-SPEED PRODUCTION OF PLASTIC MATERIAL BODIES HAVING AN OUTER SURFACE PROVIDED WITH A LABEL

TECHNICAL FIELD

This invention relates to a method for high-speed production of plastic material bodies having an outer surface provided with a label. It is a special application of the so-called "in-mold labeling" (IML) method, which will preferably be called "IML molding" hereafter. It is particularly interesting for making plastic material containers, typically boxes, pots, bottles, or tubes, having a bottom and a side wall covered by a label, said side wall extending along a surface of revolution having a perpendicular axis, such as a cylinder or a truncated cone, to the bottom plane. Even more specifically, it relates to containers of relatively small dimensions, i.e. having a diameter comprised between 13 and 60 mm, and a height comprised between 40 and 200 mm, and the side wall of which is entirely, or nearly entirely, covered by said label.

BACKGROUND ART

Molding is done by injecting plastic material into a mold having at least two parts, which are movable with respect to each other, the moving together of which allows to create the molding cavity, and the moving apart of which allows to eject the molded part. For the axially symmetric containers more specifically envisaged, the mold comprises a female part or matrix having at least one hollow cavity corresponding to the external shape of the container, and a male part or punch having at least one relief cavity corresponding to the internal side of said container.

The invention is applicable to bodies provided with a label sticking to the outer surface of one portion of the wall thereof It sticks thereon due to overmolding performed on the label: the label is introduced into the mold prior to the injection of the plastic material. The label is generally obtained from a plastic film covered with printed patterns. It may also have a multilayer structure comprising a barrier layer against diffusion of gases or flavors, typically of EVOH (ethylene vinyl alcohol), or else of metal, e.g. a PET (polyethylene terephthalate)/aluminum structure. In the latter case, the label preferably covers all or nearly all of the surface of the side wall, i.e. typically more than 95% of said surface.

Usually, before each molding cycle, a label is transferred, e.g. by a claw and/or suction cup system, to the mold, according to several possible techniques. A first technique consists in using a mandrel the shape of which is adapted to penetrate inside the hollow cavity of the matrix. The label is shaped into a cylinder and arranged around the mandrel so as to substantially adapt to the external shape thereof. The label thus deformed is held in touch with the external side of the mandrel by application of at least one holding means, typically applying forces created by a vacuum created inside the mandrel (air suction). When the mandrel arrives inside the cavity of the matrix, the means for holding the label on the mandrel is deactivated, and the label, due to resilience thereof, detaches from the mandrel and makes contact by adapting at least partially to the shape of the side wall of the cavity of the matrix.

Other techniques for placing a label inside the molding cavity have been described. Thus, the patent FR 2 627 744 discloses the use, for transferring labels, of two rotary claws winding up the label like a horn, the label thus wound up being gripped by a transfer claw inserting the label into the matrix of the mold. Furthermore, in the patent EP-B-1 009 610, the label is shaped into a cylinder or truncated cone, and the edges of the label are joined before depositing the same, after shaping thereof, on the punch. Another technique for depositing labels is described in FR 2 656 277, where a device is used comprising a two-part mold carrying a cavity, a label magazine arranged above the mold, a means for supplying a flexible label into the cavity, an organ for gripping the label in the magazine, an organ for depositing the label on a mandrel the outer shape of which corresponds to that of the object to be covered. The depositing organ comprises at least one pair of vertical slides arranged near one of the two lateral flanks of the mandrel, suitable for receiving a label supplied by the gripping organ and positioning the same opposite the mandrel, and at least one jaw having a width smaller than the distance between two slides of the same pair, designed for pushing the vertical flexible label through the pair of slides, then pressing the same against the mandrel flanks.

Furthermore, the patent U.S. Pat. No. 6,616,441 describes a molding device allowing for molded parts to be obtained by vertical injection, using two-part molding tools: a fixed "upper" mold half placed at the output of the injection press, and movable "lower" mold halves placed on an indexed rotary platen operating step by step. When a "lower" mold half is conducted to the molding station, the mold halves are aligned, the molding assembly thus created is closed and then locked, and injection is performed. With respect to "stationary" classical molding devices, this device allows in certain instances for production rates to be increased, but the injection cycle time is still very long because of the difficulties in aligning the mold halves. Also, this document does not provide for the labels to be placed inside the cavities and, if it is envisaged to include such an operation, it can only be done at the injection station, which can only further increase the corresponding cycle time at the injection station. Finally, aligning the tools, balancing the flows of plastic material, and precisely positioning the labels soon turn out to be insurmountable problems if multi-cavity moldings are to be performed, so that it often appears to be more simple and economical to do multi-cavity molding with a stationary classical device rather than a series of single-cavity moldings with a device like the one described in U.S. Pat. No. 6,616,441.

PROBLEM TO BE SOLVED

No matter which technique is used, the label is introduced into the cavity of the matrix, or laid on the punch, while the mold is open, and the previous molded part has been removed; the molding cycle time necessarily comprises at least partially some of the time for transferring the label from the magazine to the molding assembly, in particular the time corresponding to the introduction and placement of the label inside the molding cavity.

The main objective pursued by the invention is to offer a method allowing to ensure the shortest possible cycle time for producing such bodies or containers.

Another objective is to ensure repeatedly precise positioning of the label, in particular when the latter is to cover the side wall of the container entirely or almost entirely. Indeed, known transfer devices do not allow for precisely positioning the edges in front of each other, which results in a blemish or organoleptic or even hygiene-related defect, as the label cannot function as a barrier against the diffusion of gases and flavors.

Problems are amplified if it is desired to use multiple cavity molds due to the reduced floorspace which is left between two neighboring cavities to ensure the transfer of the labels into the mold, resulting in the design of transfer systems, which are even more complex when the bodies to be molded are small.

Furthermore, the high production rates, higher than several hundred parts per minute, required for producing molded tubular bodies, such as flexible tubes, have so far been considered as being incompatible with the rate of an IML molding method, which must include affixing labels inside multi-cavity tools. Indeed, the rates of such methods are limited due to the small number of cavities accommodating simultaneous and industrially reliable placement of labels. An article published Sep. 1, 2003, in the magazine "Modern Plastics" provides a good summary of the prevailing feeling in the profession: "Moldmakers and automation suppliers, as well as machine makers, all are pushing IML. ( . . . ) IML is normally limited to eight-cavity molds for containers (1×8 or 2×4 stack molds) and 2×12 for lids, but the companies are now quoting for 2×8 container systems and 2×16 lid systems . . . ". At present, for reliability reasons, industrial-level multi-cavity IML molding can only be done with a maximum of eight cavities, and with the mold's down time when the labels are laid and next during injection being typically comprised between three and ten seconds, it can be expected at best to achieve a rate comprised between 50 and 100 parts per minute. Finally, it appears that even with the number of simultaneously filled cavities envisaged for the future in this article, it will at best be possible to double the current production rate.

Therefore, the applicant has endeavored to develop a method allowing for high-speed production, typically between 100 and 400 parts per minute, of containers having an outer surface provided with a label, or else allowing for production of thicker products at the same rate as before (typically comprised between 50 and 100 parts per minute).

OBJECT OF THE INVENTION

A first object according to the invention is a method for the injection molding of bodies having at least one wall portion externally covered by a label, comprising:

a) using at least one molding assembly comprising two parts 30 and 40, which are movable with respect to each other, one of said movable parts having a cavity for making said wall portion;

b) using a label pick-up means, a label transfer means, and a label depositing means, said pick-up means allowing for a label to be picked up in a label feeding area, and for said label to be placed on said transfer means;

c) actuating said transfer means by means of a first actuator so that it arrives in alignment with said cavity, and depositing said label inside said cavity by means of said label depositing means;

d) moving said transfer means and said depositing means away, moving the other movable part of the molding assembly closer so as to form the molding cavity, then closing and locking the movable parts of the mold thus assembled in view of performing the injection of plastic material into the molding cavity;

characterized in that a machine is used which comprises:

A) an indexed rotary platen operating step by step and serving several work stations, on which platen said molding assembly is mounted;

B) an injection press, placed at one of the work stations of the rotary platen, the so-called molding station, in such a configuration that when the molding assembly arrives while being closed and locked at said molding station, said molding assembly is placed by means of a second actuator in alignment with the feeding channels of said injection press, next said molding assembly is pressed and held, typically by means of said second actuator, bearing on said injection press while the plastic injection molding cavity is being filled;

C) said label transfer means, which is placed by said first actuator at a work station, the so-called label depositing station, located upstream of the injection station, said molding assembly being opened at said label depositing station, so that said label can be deposited into said cavity by means of said label depositing means.

A label is defined as any portion of a flexible film or sheet, typically of plastic material, which can support decorated patterns, any flat and flexible insert, or any thin substrate containing a printed circuit and/or an antenna, e.g. an RFiD label, i.e. an electronically programmed radiofrequency identification label automatically emitting a signal in response to the query signal received.

The molding assembly comprises two parts, which are movable with respect to each other, the moving together of which allows for the molding cavity to be created, and the moving apart of which not only allows for the molded part to be ejected, but also for access to the label depositing device so that said label can be deposited into said cavity. The molding assembly also comprises a handling device ensuring opening, closing, and locking of said movable parts, and applying sufficient force to resist opening while the plastic material is injected into the molding cavity.

The term "indexed rotary platen operating step by step" is to be understood as a general term meaning any device capable of displacing the molding assemblies from one work station corresponding to one step of the molding method to a station corresponding to the next step. As it is complicated and costly to perform injection molding with continuous kinematics, it is preferable to use a device allowing to take the molding assembly from one station to the other and to make them stop at each station. In practice, an indexed rotary platen operating step by step is preferably chosen, as it is a device perfectly suitable for this kind of operation. Advantageously, the rotary platen is divided into n sectors corresponding to the n work stations, n being an integer typically comprised between 2 and 24, preferably between 4 and 12, further preferably between 6 and 8. Of course, it is advantageous to fit each sector of the rotary platen with at least one molding assembly.

The label pick-up means, the transfer means, and the label depositing means may be separate devices, or on the contrary, may be grouped together in devices having at least two functions. Preferably, the label feeding area and the pick-up means are located at or near the label depositing station. The depositing means may be placed either on the rotary platen, or preferably associated with the label transfer means, i.e. integral with said transfer means, supported thereby or secured thereon.

According to the invention, the molding assembly arrives in the closed and locked state at the station where the injection press is located, the label having already been placed inside the molding cavity. Thus, the time spent for precisely positioning the label inside the molding cavity, precisely aligning the movable parts of the molding assembly, and finally for closing and locking said molding assembly is not included in the cycle time corresponding to the down time of the rotary platen at the injection station, and these operations can be implemented as a background task, either by means of devices placed directly on the rotary platen, or by means of devices associated with a station located upstream of the injection station. Once closed and locked, the molding assembly can be placed rapidly in the injection position, in particular if the method is followed, which is described in the French patent application filed by the applicant with the number 07/07536 the same day as the French patent application of which the present patent application claims priority. In the following paragraphs, the gist of the steps of this method will be taken up again, the reader being invited to read the document for additional information regarding the terms employed or any development regarding the description of the thus-mentioned steps.

This French patent application 07/07536 describes an injection molding method, which is suitable in particular for simultaneously molding plastic material inside several molding cavities (multi-cavity molding), but which is also applicable to single-cavity molding. In this method, a molding tool is used comprising an injection head integral with the injection press, and a molding assembly, the plastic material being injected under pressure while passing through feeding channels made in the injection head, and being temperature-controlled, said feeding channels opening on to the molding cavities when the molding assembly is aligned with said molding head. The molding assembly comprises two parts, which are movable with respect to each other, and the moving together of which allows for said molding cavities to be created, and the moving apart of which allows for the molded parts to be ejected. The molding assembly also comprises a handling device ensuring opening, closing, and locking of said movable parts, and applying sufficient force to resist opening during injection. In this method, none of said movable parts of the molding assembly is secured to the injection head, the molding assembly not making contact with said injection head, and bearing thereon only when it is located in the closed and locked position in view of filling the molding cavities by plastic injection.

In other words, due to the method described in the French patent application 07/07536, a molding tool is used comprising on the one hand a stand-alone molding assembly grouping the various parts of the molds together, and on the other hand a fixed injection head integral with the injection press, provided with feeding channels, and at it is possible to adjust the balancing of the plastic material flows. Advantageously, the part of said molding assembly, which is meant to bear on said injection head is provided with at least one injection nozzle in alignment with the output of a feeding channel. Said injection head is preferably provided, for each molding cavity, with at least one feeding probe, which is located at the outlet of the feeding channel and opposite of which said injection nozzle is placed. Said injection nozzle is advantageously provided with a preferably spherical surface, complementary to the surface of the feeding probe with which it is associated, thus enabling proper alignment of said injection nozzle and said feeding probe when said molding assembly is made to bear on said injection head. Typically, the injection nozzle is heated by a heating member, which is preferably individually controllable. Said injection head is also advantageously provided with at least one dosing cylinder, which is fed by a feeding channel, and which allows for injection of a controlled quantity of plastic material into the molding cavity associated with the feeding channel. Said dosing cylinder is typically associated with a valve, which, when the molding assembly is not bearing on the injection head, allows both for the channel of the feeding probe to be closed, and for the chamber of the dosing cylinder to be filled, and which, when the molding assembly is bearing on said injection head, closes the inlet of the feeding channel in the chamber of the dosing cylinder and communicates said chamber with said channel of said feeding probe.

In a preferred mode of this method, an injection head is used which is provided with as many dosing cylinders and valves as there are outputs of channels feeding the molding cavities with plastic material. Said dosing cylinders and said valves may be actuated individually. Advantageously, at least one molding assembly is mounted on an indexed rotary platen operating step by step and serving several work stations, the injection press provided with said injection head being placed at one of the work stations. Said molding assembly is actuated in the direction of said injection head by means of an actuator located outside said rotary platen, said actuator being placed at the work station where said injection press is located, one of the movable parts of the molding assembly being mounted on said rotary platen so that it may slide along an axis parallel to the rotational axis of said rotary platen, whereby, when the molding assembly appears, the movable parts thereof being closed and locked, said actuator also acting along an axial direction drives said molding assembly towards said injection head and applies a bearing force throughout the injection time.

The inventive method is particularly well applicable to IML molding of containers having a convex wall portion covered by a label, said label being easily deposited inside the hollow cavity of the mold part meant for forming said convex portion.

It is even more particularly suitable for molding bodies having a substantially planar bottom and a side wall, said side wall extending according to a surface of revolution having an axis perpendicular to the plane of said bottom, typically a container having a flat bottom and a substantially cylindrical or conical side wall, or a blank of a flexible tube with a tube head provided with a distribution orifice, either flat, or composed of a cylindrical neck and a substantially tapered shoulder connecting said neck to said side wall.

In a preferred mode of the invention, the body to be molded has a bottom and a side wall extending according to a surface of revolution having an axis perpendicular to the plane of said bottom, such as a cylinder or a truncated cone, and being covered by a label. Such a configuration allows for the production of such bodies to be simplified, due to placing on the single side wall labels supporting all of the decorative patterns designed to decorate said bodies. In this preferred mode of the invention:

a') said molding assembly comprises a female part or matrix having at least one hollow cavity corresponding to the external shape of said body, and a male part or punch having at least one relief cavity corresponding to the internal side of said body;

b') said label transfer means is a mandrel on which said label is deposited when it is in the horizontal position; thus it is located resting on the upper surface line of said mandrel;

c') said label is held on said mandrel by a holding means;

d') by means of said first actuator, said mandrel is introduced into the cavity of the matrix while said label is still held by means of the holding means;

e') when said mandrel has penetrated into the cavity up to a predetermined depth, said holding means is used as a depositing means, by suppressing or reversing the holding action of said holding means.

Preferably, said mandrel is a cylindrical mandrel having a diameter which is slightly smaller than that of the matrix, the deviation being typically comprised between 0.2 mm and 1 mm. After the label has been placed on the mandrel, the label is shaped so that it adapts to the shape of said mandrel, whereby the label thus shaped can penetrate into the hollow cavity of the matrix without touching the wall of the cavity.

For shaping the label on the mandrel, a shaping means can be used, comprising a hollow, typically cylindrical surface complementary to the surface of the mandrel. The mandrel is advantageously provided with through channels, inside which air can be aspirated or blown so that said mandrel functions as a holding means when air is aspirated, and said mandrel functions as a depositing means when air is no longer aspirated, or rather is blown inside said through channels.

Holding the label inside the cavity of the matrix may be ensured by static electricity using known methods. This can be largely facilitated if the label has sufficient width, typically corresponding to more than half of the circumference of the side wall. After air suction has stopped, the label is unwound either by resilience or under the effect of the blow air, the edges of the label making contact with the wall of the cavity of the matrix. The extent of the contact surface and the friction related to the bearing effort of the label on the wall of the mold can reach sufficient values for the label to stay in place and keep steady inside the cavity of the matrix, without the necessity of applying any additional effort. However, the use of static electricity for helping in holding the label inside the cavity is still recommended.

The method according to this preferred alternative of the invention is particularly well suited to IML molding of containers having an axially symmetric side wall entirely or nearly entirely covered by a label, i.e. containers provided with a label typically covering more than 95% of the area of said side wall. With the label entirely or nearly entirely covering the wall of the container, a shaping means is used advantageously which comprises an upper shell half and a lower shell half and, for bringing the label into the cavity of the mold, the following is performed:

i) picking-up the label, typically by means of a suction cylinder;

ii) providing a mandrel provided with channels having through orifices, inside which air can be aspirated or blown, and placing the mandrel horizontally;

iii) aspirating air through the mandrel channels, depositing the label on the upper surface line of said mandrel placed horizontally;

iv) lowering the upper shell half pressing the label onto the upper part of the mandrel;

v) continuing shaping by raising the lower shell half so that the edges of the label follow the wall of the hollow surface of the lower shell half until the section of the label thus shaped has such an envelope that it can be comprised within the section of the cavity of the matrix;

vi) removing the shell halves while maintaining air suction through said mandrel;

vii) by means of a first actuator, introducing said mandrel into the cavity of the matrix while maintaining sufficient suction power for the label thus shaped to be held;

viii) when the mandrel has penetrated into the cavity up to a predetermined depth, reversing the direction of air flow inside the channels of the mandrel so that the label unwinds and the edges thereof make contact with the side wall of the cavity of the matrix.

Thus, containers are obtained which are provided with a label entirely or nearly entirely covering the wall of the container: not only can it support all of the container's decorative patterns, but it can also fulfill another function, in particular, it can protect the product contained in the container, having for instance a multilayer structure comprising a barrier layer against diffusion of gases or flavors, or a barrier layer against ultraviolet rays. The label may have an area slightly greater than that of the side wall. In this case, the aim is to cover the edges, the width of which is typically limited to one millimeter. The edges of the label are guided by the wall of the hollow surface of the lower shell half described above, in order to overlie each other, but the final geometric configuration must always meet the requirement that in order to prevent the edges or any other part of the label from touching the wall of the cavity of the matrix when the mandrel is introduced inside the cavity of the matrix, the envelope of the section of the label thus shaped must be comprised within the section of the cavity of the matrix.

Preferably, after pick-up thereof, the label is positioned slightly off balance on the mandrel placed horizontally: the aim is for the medial axis of said label together with upper surface line of the mandrel to form an angle comprised between 5 and 15° (as measured in a plane perpendicular to the axis of the mandrel). The applicant has indeed found that by keeping such a slight unbalance, the label will shape on the mandrel in a repeated and reliable fashion.

In order to hold the wound-up label efficiently around the mandrel, the latter is advantageously provided with at least three rows of through channels, one row being aligned on the upper surface line of said mandrel, and two rows being aligned along symmetrical surface lines with respect to the vertical diametral plane of said mandrel, located near the lower surface line of the mandrel, with the edge closest to the orifices being located at a distance of approximately 3 mm from said lower surface line, typically comprised between 1 and 5 mm. Typically, the orifices of the through channels are arranged regularly on said surface lines at an average distance of approximately 3 mm from each other. Typically, for polypropylene labels having a thickness comprised between 50 and 200 µm, by aspirating air with a vacuum of about 4 to 5 bars, said label can be held pressed down on the mandrel and introduced into the cavity of the matrix.

When the label is self-holding inside the cavity of the matrix, i.e. typically if the width thereof is greater than half the circumference of the side wall, precisely placing said label inside the cavity of the mold can be done reliably by taking the following precautions:

a") the predetermined penetration depth of the mandrel inside the cavity of the matrix is such that when the first actuator is stopped, the end of the label protrudes from the cavity of the matrix, typically by a distance of about 1 mm, preferably less than 1 mm;

b") using a punch, the side surface of which is provided with a shoulder forming a mating surface with the matrix, and placed at such a distance that when the punch and the matrix are moved together, the protruding end of the label comes into abutment against said shoulder and is driven thereby in the direction of the bottom of the matrix until it occupies its final position.

Indeed, the applicant has found that with labels occupying half the surface of the side wall, the final placement of the label can be ensured in a repeated and precise fashion due to the final axial movement forced by the advance of the punch inside the cavity of the matrix: the two edges coming into abutment against said shoulder must place themselves at the same level, resulting in realignment of the whole label.

Further preferably, the label has a height slightly greater than the height of the side wall of the container. Thereby, when the punch and the matrix are attached in view of forming the molding cavity, the other end of the label, the so-called second end, protrudes from the punch into the molding cavity, and it can be dealt with in the same way as a skirt end over which a tube end is molded. Thus, the cavity of the bottom of the matrix is advantageously made especially for receiving said second end of the label.

When a tube is to be made, having a head comprising a neck and a shoulder connecting said neck to the side wall, the bottom of the cavity of the matrix has a substantially tapered shape corresponding to the shape of the shoulder. This shape is extended in the peripheral part designed for molding the connection with the side wall, by making it also tapered or preferably toric, one end being tangent to the substantially tapered surface of the shoulder, the other end being tangent to the side wall, so that the second end of the label, making contact with said peripheral part of the bottom of the cavity of the matrix being slightly reduced. During injection, this label end, before locally and intimately mixing with the fused plastic material in flow, will seal the area of the matrix forming the periphery of the shoulder by preventing the flow of the fused plastic material towards the outside of said label.

When a container is to be made which has a substantially flat bottom and an axially symmetric side wall, the bottom of the cavity of the matrix has a substantially flat shape corresponding to the shape of the bottom of the container. It is advantageous to create a shape specific to the peripheral part of the cavity which is located near the connection between said bottom and said axially symmetric side wall:

1) at the periphery, the side wall of the cavity opposite the punch remains substantially axial;

2) when the matrix and the punch make contact with one another, the bottom of the cavity of the matrix being located in alignment with the side wall is located at a depth greater than the protruding height of the second end of the label, so that said second end does not come into abutment on the bottom of said matrix cavity, and during injection, the plastic material injected at a point located near the axis must flow radially into an annular peripheral area located above the top edge of said second end;

3) the bottom of the matrix has an annular boss hindering the plastic material flow towards said annular peripheral area, the outer edge of said annular boss and the inner edge of said second end being spaced apart from each other by a value which is smaller than the average thickness of the bottom, preferably smaller than half said thickness.

This recommended shape has been suggested in analogy to the approach described in the French application no. 07/02221 when overmolding a tube head onto a cylindrical skirt, the label herein functioning as the cylindrical skirt. When punch and matrix have been moved together, such an annular boss is a throttle which will slow down the flow of the plastic material, resulting in a local increase of shearing inside the material flow and an increase of forced division at the top of the label. The result is a local intimate mixing of the plastic materials of the container and the label.

Another object of the invention is a machine allowing for the inventive method to be implemented, comprising said indexed rotary platen, on which at least one molding assembly as defined previously, at least one molding station fitted with an injection press, downstream of which at least one label depositing station as described previously is located are mounted.

FIGURES

FIG. 1 schematically illustrates a machine by which the inventive method may be implemented.

Figure 4:
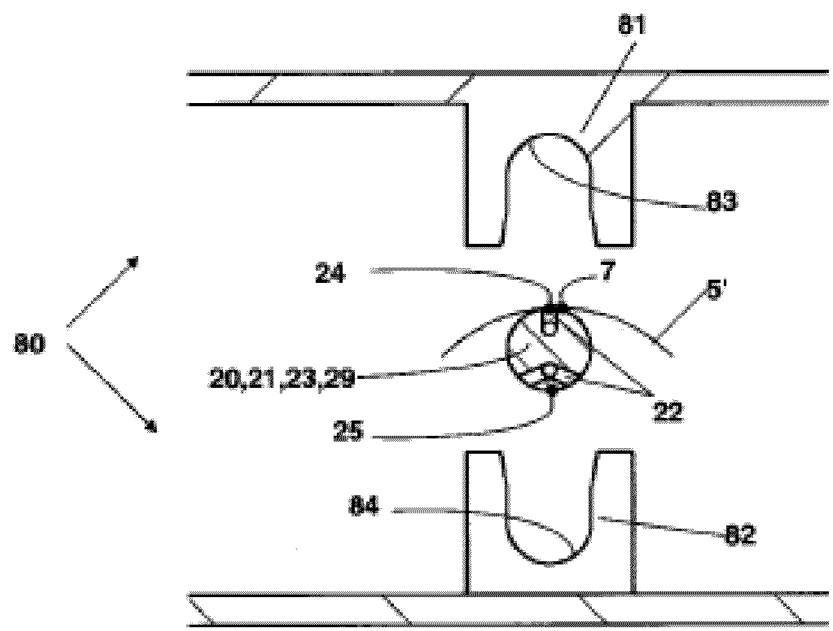

FIG. 4 schematically illustrates the proximity of an inventive mandrel used for transferring the label from a storage area to the molding cavity, shortly before the label is shaped around the mandrel.

Figure 5A:
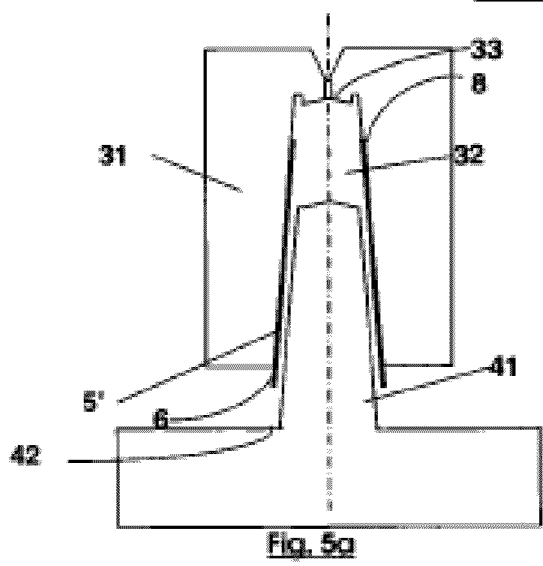

FIG. 5a schematically illustrates a molding assembly designed for making a container having a substantially flat bottom and a tapered side wall after a label has been deposited inside the cavity of the matrix.

Figure 5B:
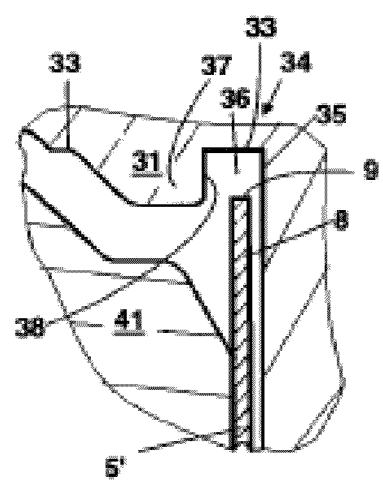

FIG. 5b details the diagram of FIG. 4a in the peripheral part of the matrix which is located near the connection between said bottom and said tapered side wall.

EXAMPLE

FIGS. 1 to 5b

Figure 1:
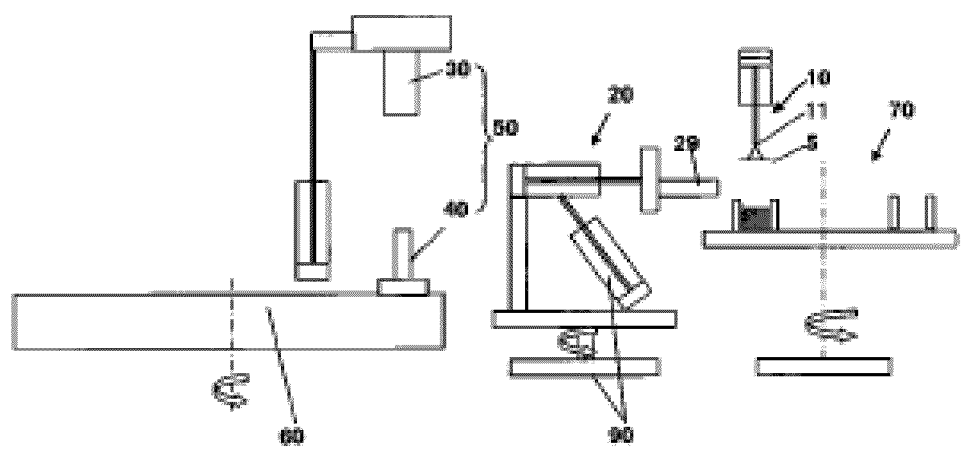
Figure 2:
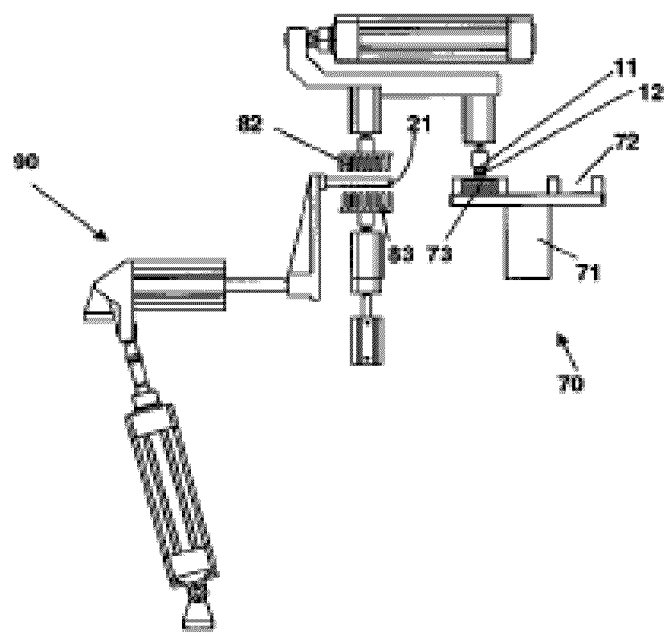
FIG. 2 illustrates in a front view the devices placed at a label depositing station of a machine specific to the invention.
Figure 3:
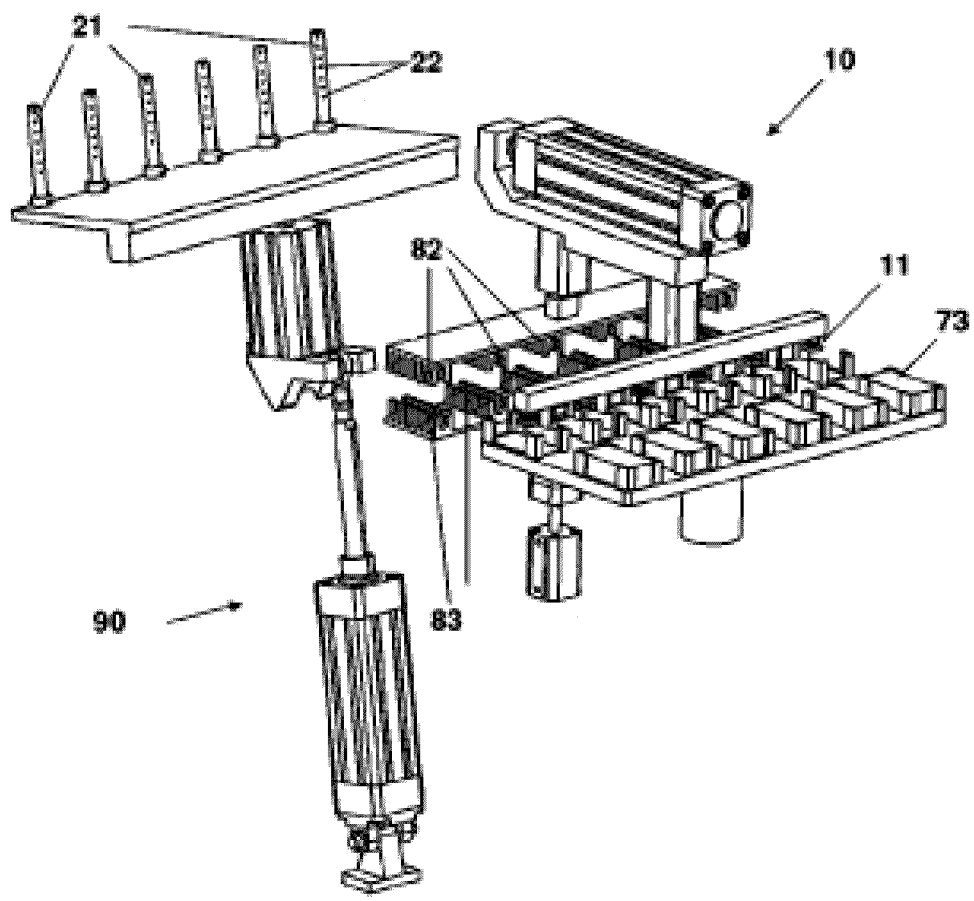
FIG. 3 illustrates in perspective the devices of FIG. 2, with the transfer device in a position for introducing the labels into the matrix cavities.

For molding containers having a substantially flat bottom and an axially symmetric side wall entirely covered by a label, a machine is used, comprising:

an indexed rotary platen 60 operating step by step and subdivided into six sectors for serving six work stations. On this platen are mounted, inside each of the six sectors, six molding assemblies 50, each comprising six matrices 31, grouped together into a matrix-carrier assembly 30, and six punches 41 grouped together into a punch-carrier assembly 40; the punches and the matrices herein being rake-like, aligned so that the axes thereof are parallel and equidistant;

an injection press (not illustrated) placed at one of the work stations of the rotary platen;

a label depositing device located upstream of the injection station, schematically shown in FIG. 1 and in detail in FIGS. 2 and 3, comprising six integral mandrels 21 placed in rake-shape with a distance between the axes thereof identical to that of the matrices and the mandrels, each one acting as a label transfer means 20 driven by a first actuator 90, which is in fact an assembly of cylinders and rotary motors allowing for the mandrels 21 to be positioned substantially horizontally so that they receive the labels 5 and to be positioned substantially vertically so that they can be introduced, provided with the labels, inside the cavities 32 of the matrices 31, the molding assembly 50 being opened at said label depositing station, so that said labels can be deposited inside said cavities.

Feeding of the labels is ensured by a rotary table 71 comprising two diametrically opposed magazines 72 and 73, one (72) being ready for filling, the other one (73), which comprises six stacks of labels, being placed under six suction cylinders 11, each one acting as a label pick-up means 10. The suction cylinder assembly 11 can be moved above an area where the mandrels 21 actuated by the actuator 90 are placed horizontally for each receiving one label 5'.

The labels 5' have been cut out from a flexible plastic multilayer sheet, comprising an external layer with a four-color flexographic print, and a PET/Al complex composing a barrier against gas diffusion. They have a width, which is greater by roughly 1 mm than the circumference of the side wall of the container to be made. They have a length, which is greater by roughly 1 mm than the height of the side wall of the container to be made.

The labels 5' are positioned so that they arrive slightly off balance on their mandrels 21: the medial axis 7 thereof together with the upper surface line 24 of the associated mandrel forming an angle of about 10° (as measured in a plane perpendicular to the axis of the mandrel).

The mandrels 21 are cylindrical with sections having diameters smaller by 0.5 mm than those of the matrices. Each mandrel 21 is provided with channels 22 opening onto the surface thereof, and wherein air can be aspirated or blown.

While air is aspirated through the channels 22 of the mandrels 21, the labels 5' are released from the suction cups 11, and the latter come to rest on the upper surface line 24 of the mandrels 21 placed horizontally. In order to shape the labels 5' on the mandrels 21, 6 upper shell halves 83 are lowered, also arranged in rake-shape and pressing the labels onto the upper part of the mandrels. Shaping of the label is continued by raising the 6 lower shell halves 83. During this rise, for each label, the edges will follow the wall of the hollow surface 84 of the lower shell half 83 until they overlap by about one millimeter. The final geometric configuration of the label thus shaped is such that the edges or any other part of the label does not touch the wall of the cavity of the matrix when the mandrel is introduced into the cavity of the matrix.

The shell halves are removed while maintaining air suction through said mandrels 21. By means of the first actuator 90, the mandrels 21 are moved in the direction of the rotary platen and the 6 molding assemblies 50, maintained in the open position. The six mandrels 21 are introduced into the 6 cavities 32 of the matrices 31 while maintaining sufficient suction power for the labels thus shaped to be held.

Each mandrel 21 is provided with three rows of through channels 22, one row aligned with the upper surface line 24 of said mandrel and two rows aligned along the symmetrical surface lines with respect to the vertical diametral plane of said mandrel, the edge closest to the orifices being located at a distance of about 3 mm from the lower surface line 25. The orifices are arranged regularly on said surface lines at a distance of about 3 mm from each other. Due to air suction at a vacuum of about 4 to 5 bars, it is possible to keep said labels pressed onto the mandrels and introduce them inside the cavities of the matrices without any collision.

When the mandrels 21 have penetrated into the cavities 32 up to a predetermined depth, the direction of air flow inside the channels 22 of the mandrel 21 is reversed so that the labels unwind and their edges make contact with the side walls of the cavities 32.

The predetermined penetration depth of the mandrels into the cavities is defined so that when it is reached, the ends of the labels protrude from the cavities of the matrices by a distance of about 1 mm.

The punches 41 have a side surface which is provided at the base with a shoulder 42 forming a mating surface with the associated matrix 31. The shoulder is placed at such a distance that when the punch 41 is moved towards the matrix 31, the protruding end 6 of the label 5' comes into abutment against said shoulder 42 and is driven thereby in the direction of the bottom 33 of the matrix 31 until it occupies its final position.

When the punch 41 and the matrix 31 are attached so as to form the molding cavity, the second end 8 of the label protrudes from the punch 41 into the molding cavity. The peripheral part 34 of the cavity has the following shape:
  peripherally, the side wall 35 of the cavity opposite the punch 41 remains substantially axial;
  when the matrix 31 and the punch 41 make contact with one another, the bottom 33 of the cavity 32 of the matrix 31 located in alignment with the side wall is located at a depth greater than the protruding height of the second end 8 of the label, so that said second end does not come into abutment on the bottom of said matrix cavity, and during injection, the plastic material injected at a point located near the axis must flow radially into an annular peripheral area 36 located above the top edge of said second end;
  the bottom of the matrix has an annular boss 37 hindering the plastic material flow towards said annular peripheral area 36, the outer edge 38 of said annular boss 37 and the inner edge of said second end being spaced apart from each other by a value which is smaller than the average thickness of said bottom.

The molding assemblies are then closed and locked, and the rotary platen will turn so that the molding assemblies will reach the molding station. Downstream, two stations are dedicated to cooling the containers thus molded, and one station is dedicated to ejecting the molded containers after the molding devices have been opened. A handling device ensuring opening, closing, and locking of the movable parts of the molding assemblies is placed in each sector of the rotary platen, associated with the six punches and the six matrices. Thus, this operation can be done as a background task, independently from the down time at each station.

With such a machine, at a rate of 180 parts per minute, it is easy to make the following:
  blanks for integral tubes, the thin skirt of which, having a thickness comprised between 200 and 600 μm, is entirely covered by a label,
  or else, mascara pots, the side wall of which, which is a little thicker, typically comprised between 0.6 and 1.5 mm, is also entirely covered by a label.

LEGEND 5, 5' label
6 protruding end of the label
7 medial axis of the label
8 second end of the label
10 label pick-up means
11 suction cylinder
20 label transfer means
21 label transfer mandrel
22 through channel
23 label holding means
24 upper surface line of the mandrel
25 lower surface line of the mandrel
29 label depositing means
30 first movable part of the molding assembly
31 matrix
32 cavity of the matrix
33 bottom of the cavity
34 part of the cavity designed for forming the connection between the bottom of the container and the side wall of the container
35 side wall of the cavity
36 annular peripheral area
37 annular boss
38 outer edge of the annular boss
40 second movable part of the molding assembly
41 punch
42 shoulder of the punch forming a mating surface
50 molding assembly
60 rotary platen
70 label feeding area
71 rotary table
72 magazine (empty, in stand-by)
73 label magazine
80 shaping means
81 upper shell half
82 lower shell half
83 hollow surface
84 hollow surface of the lower shell half
90 first actuator

The invention claimed is:
1. A method for injection molding bodies having at least one wall portion externally covered by a label, comprising:

a) using at least one molding assembly (50) comprising two parts (30 and 40), which are movable with respect to each other, one (30) of said movable parts having a cavity for making said wall portion;
b) using a label pick-up means (10), a label transfer means (20), and a label depositing means (29), said pick-up means allowing for a label to be picked up in a label feeding area (70), and for said label to be transmitted to said transfer means;
c) actuating said transfer means by means of a first actuator (90) so that it arrives in alignment with said cavity, and depositing said label inside said cavity by means of said label depositing means;
d) moving apart said transfer means and said depositing means, moving together the other movable part of the molding assembly so as to form the molding cavity, next closing and locking the movable parts of the mold thus assembled in view of performing the injection of plastic material into the molding cavity;
characterized in that a machine is used, which comprises:
A) an indexed rotary platen (60) operating step by step and serving several work stations, on which said molding assembly is mounted;
B) an injection press, placed at one of the work stations of the rotary platen, the so-called molding station, in such a configuration that when the molding assembly arrives in the closed and locked state at said molding station, said molding assembly is placed by means of a second actuator in alignment with the feeding channels of said injection press, next said molding assembly is pressed and held, typically by means of said second actuator, bearing on said injection press while the plastic injection molding cavity is being filled;
C) said label transfer means (20), which is placed by said first actuator (90) at a work station, the so-called label depositing station, located upstream of the injection station, said molding assembly being opened at said label depositing station, so that said label can be deposited into said cavity by means of said label depositing means;
wherein said body to be molded has a substantially planar bottom and a side wall extending according to a surface of revolution having an axis perpendicular to the plane of said bottom and which is covered by a label, wherein:
a') said molding assembly (50) comprises a female part or matrix (31) having at least one hollow cavity corresponding to the external shape of said body, and a male part or punch (41) having at least one relief cavity corresponding to the internal side of said body;
b') said label transfer means (20) is a mandrel (21) on which said label (5') is deposited when it is in the horizontal position;
c') said label is held on said mandrel by a holding means (23);
d') by means of said first actuator (90), said mandrel (21) is introduced into the cavity of the matrix (31) while still holding said label by means of said holding means (23);
e') when said mandrel (21) has penetrated into the cavity up to a predetermined depth, said holding means is used as a depositing means (29), by suppressing or reversing the holding action of said holding means;
wherein a label (5') is chosen which has a height slightly greater than the height of the side wall of the container so that after the punch and the matrix have been moved together, the second end (8) of the label protrudes from the punch into the molding cavity; wherein said body to be molded is a container having a substantially flat bottom and an axially symmetric side wall, and wherein the peripheral part of the cavity (32), near the part (34) designed for forming the connection between said bottom and said axially symmetric side wall has the following shape:
1) peripherally, the side wall (35) of the cavity (32) opposite the punch (41) remains substantially axial;
2) when the matrix (31) and the punch (41) make contact with one another, the bottom of the cavity (32) of the matrix (31) located in alignment with the side wall is located at a depth greater than the protruding height of the second end (8) of the label (5'), so that said second end (8) does not come into abutment on the bottom (33) of said matrix cavity (32), and during injection, the plastic material injected must flow radially into an annular peripheral area (36) located above the top edge (9) of said second end (8);
3) the bottom of the matrix has an annular boss (37) hindering the plastic material flow towards said annular peripheral area (36), the outer edge (38) of said annular boss and the inner edge of said second end (8) being spaced apart from each other by a value which is smaller than the average thickness of the bottom, preferably smaller than half said thickness.

2. The method according to claim 1, wherein said rotary platen (60) is divided into n sectors corresponding to n work stations, n being an integer typically comprised between 2 and 24, preferably between 4 and 12, further preferably between 6 and 8, each sector of the rotary platen being fitted with a molding assembly (50).

3. The method according to claim 1, wherein said depositing means (29) is associated with the label transfer means (20) which is actuated by said first actuator (90) at the label depositing station.

4. The method according to claim 1, wherein said body to be molded has a convex wall portion covered by a label, and wherein said label is deposited inside the hollow cavity of the mold part designed for forming said convex portion.

5. The method according to claim 1, wherein said mandrel (21) is a cylindrical mandrel having a diameter which is slightly smaller than that of the matrix, the deviation being typically comprised between 0.2 mm and 1 mm.

6. The method according to claim 1, wherein, the label having been deposited on said mandrel, the label is shaped by means of a shaping means (81), comprising a hollow surface (83) complementary to the surface of the mandrel (21), so that said label adapts to the shape of said mandrel and the label thus shaped can penetrate into the hollow cavity of the matrix without touching the wall of said cavity.

7. The method according to claim 1, wherein the mandrel is provided with channels (22) having through orifices, inside which air can be aspirated or blown so that said mandrel (21) functions as said holding means (23) when air is aspirated, and said mandrel functions as said depositing means (29) when air is no longer aspirated or is blown inside said through channels.

8. The method according to claim 1, with said label covering entirely or nearly entirely the wall of the container, wherein a shaping means is used comprising an upper shell half (81) and a lower shell half (82), and for bringing the label (5') into the molding cavity, the following steps are performed:
i) picking up the label by means of said pick-up means (10), typically by means of a suction cylinder (11);
ii) providing a mandrel (21) provided with channels (22) having through orifices, inside which air can be aspirated or blown, and placing the mandrel horizontally;

iii) aspirating air through the mandrel channels, depositing the label (5') on the upper surface line (24) of said mandrel placed horizontally;
iv) lowering the upper shell half (81) pressing said label onto the upper part of the mandrel;
v) shaping is continued by raising the lower shell half (82) so that the edges of the label follow the wall of the hollow surface (84) of the lower shell half (82) until the section of the label thus shaped has such an envelope that it can be comprised within the section of the cavity of the matrix;
vi) removing said upper and lower shell halves (81 and 82) while maintaining air suction through said mandrel (21);
vii) by means of the first actuator (90), introducing said mandrel into the cavity of the matrix while maintaining sufficient suction power for the label thus shaped to be held;
viii) when the mandrel has penetrated into the cavity up to a predetermined depth, reversing the direction of air flow inside the channels of the mandrel so that the label unwinds and the edges thereof make contact with the side wall of the cavity of the matrix.

9. The method according to claim 8, wherein said mandrel (21) is provided with at least three rows of through channels, one row aligned on the upper surface line (24) of said mandrel, and two rows aligned according to symmetrical surface lines with respect to the vertical diametral plane of said mandrel, located near the lower surface line (25) of the mandrel, with the edge of the through orifices being located at a distance of about 3 mm from said lower surface line, typically comprised between 1 and 5 mm.

10. The method according to claim 8, wherein said through orifices are arranged regularly on said surface lines, at an average distance of about 3 mm from each other.

11. The method according to claim 8, wherein the label (5') is positioned slightly off balance on the mandrel (21) placed horizontally, the medial axis (7) of said label together with said upper surface line (24) of the mandrel forming an angle comprised within 5 and 15° (as measured in a plane perpendicular to the axis of the mandrel).

12. The method according to claim 1, wherein:
a") the predetermined penetration depth of the mandrel (21) into the cavity of the matrix (31) is such that when the first actuator (90) is stopped, the end (6) of the label (5') protrudes from the cavity (32) of the matrix (31), typically by a distance of about 1 mm, preferably less than 1 mm;
b") a punch (41) is used, the side surface of which is provided with a shoulder (42) forming a mating surface with the matrix, and placed at such a distance that when the punch and the matrix are moved together, the protruding end of the label comes into abutment against said shoulder and is driven thereby in the direction of the bottom of the matrix until it occupies its final position.

13. The method according to claim 1, wherein said body to be molded is a tube having a head comprising a neck and a substantially tapered shoulder connecting said neck to the side wall, and wherein the peripheral part of the bottom of the cavity, designed for molding the connection with the side wall is tapered or, preferably toric, one end being tangent to the substantially tapered surface of the shoulder, the other end being tangent to the side wall, so that said second end of the label, making contact with said peripheral part of the bottom of the cavity of the matrix being slightly reduced.

* * * * *

UNITED STATES PATENT AND TRADEMARK OFFICE
CERTIFICATE OF CORRECTION

PATENT NO.       : 8,414,812 B2                                                                   Page 1 of 1
APPLICATION NO. : 12/739805
DATED            : April 9, 2013
INVENTOR(S)      : Dominique Chaslin It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 521 days.

Signed and Sealed this
First Day of September, 2015

Michelle K. Lee
*Director of the United States Patent and Trademark Office*